US000001349H

United States Statutory Invention Registration [19]

[11] Reg. Number: H1349

Kelley

[43] Published: Sep. 6, 1994

[54] BUSHING REMOVAL TOOL

[75] Inventor: Malcolm E. Kelley, Yellow Springs, Ohio

[73] Assignee: The United States of America as represented by the Secretary of the Air Force, Washington, D.C.

[21] Appl. No.: 70,006

[22] Filed: May 24, 1993

Related U.S. Application Data

[62] Division of Ser. No. 907,958, Jul. 2, 1992, abandoned.

[51] Int. Cl.[5] ..... B23P 19/04

[52] U.S. Cl. ..... 29/259; 29/263

[58] Field of Search ..... 29/262, 263, 265, 266, 29/259

[56] References Cited

U.S. PATENT DOCUMENTS

| | | | |
|---|---|---|---|
| 1,310,270 | 7/1919 | Atzberger | 29/263 |
| 1,422,390 | 7/1922 | Timm | 29/263 |
| 1,448,597 | 3/1923 | Pitzer | 29/244 |
| 1,513,031 | 10/1924 | Brown | 29/262 |
| 1,517,883 | 12/1924 | Alleman | 29/262 |
| 1,553,171 | 9/1925 | Jones | 29/262 |
| 1,589,262 | 6/1926 | Quint | 29/263 |
| 1,599,176 | 9/1926 | Hersee | 29/263 |
| 1,601,660 | 9/1926 | Watkins | 29/265 |
| 1,608,407 | 11/1926 | Macias | 29/263 |
| 1,676,775 | 7/1928 | Doherty | 29/262 |
| 2,257,318 | 9/1941 | Wilborn | 29/262 |
| 2,859,456 | 11/1958 | Taylor | 29/244 |
| 3,270,407 | 9/1966 | Aravjo | 254/100 |
| 3,691,612 | 9/1972 | Layne | 29/266 |
| 3,978,573 | 9/1976 | Williams | 29/267 |
| 4,047,771 | 9/1977 | Vaughn et al. | 384/441 |
| 4,057,889 | 11/1977 | Ferguson | 29/266 |
| 4,339,865 | 7/1982 | Shultz | 29/525 |
| 4,494,290 | 1/1985 | Rutledge | 29/280 |
| 4,507,838 | 4/1985 | Hacker | 29/266 |

FOREIGN PATENT DOCUMENTS

| | | | |
|---|---|---|---|
| 567855 | 3/1945 | United Kingdom | 29/263 |

*Primary Examiner*—David Brown

*Attorney, Agent, or Firm*—Fredric L. Sinder; Thomas L. Kundert

[57] ABSTRACT

A new bushing removal tool for removing bushings from aircraft transparencies combines a U-shaped tool body, supporting base plates, a threaded shaft extending through the tool body, a large nut screwed on one end of the threaded shaft and a bushing puller on the other end of the threaded shaft. The bushing puller has a pivoting tip which, in one pivoted position, allows the bushing puller to fit through the bushing and, in another pivoted position, engages the bushing so that, when the large nut is rotated, the bushing puller is pulled up. The bushing is pulled up with the bushing puller. A hydraulic or pneumatic cylinder and piston can be used in place of the threaded shaft and large nut. A specially shaped shaft with a fixed tip can be used as the bushing puller for small or fragile bushings.

1 Claim, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

BUSHING REMOVAL TOOL

RIGHTS OF THE GOVERNMENT

The invention described herein may be manufactured and used by or for the Government of the United States for all governmental purposes without the payment of any royalty.

This application is a division of application Ser. No. 07/907,958, filed Jul. 2, 1992, now abandoned.

BACKGROUND OF THE INVENTION

The present invention relates generally to bushing removal tools, and more particularly to a new bushing removal tool for removing bushings from an aircraft transparency without damaging the transparency.

Bushings are typically installed in aircraft windshields and canopies, generically called transparencies, at the time of manufacture. The bushings are installed inside transparency bolt holes. The edges of the transparency may also have a reinforcing edge member. Bolts inserted through the bolt holes attach the transparency to a frame or directly to an aircraft.

It is very difficult to inspect the area surrounding transparency bolt holes in the field for cracks or other defects. Adequate inspection requires removing the bushings without damaging the transparency. In addition, transparencies are often removed for other reasons, such as scratches or coating problems, and either returned to the factory or sent to a depot level repair facility. There the bushings similarly need to be removed to inspect the bolt holes. Often, at the factory or depot level, a crazed area surrounding a bolt hole can be removed by drilling out the hole and a larger outer diameter bushing inserted.

A proposed new transparency edge member design includes an option of transitioning to larger size attach bolts. The proposed new design includes a permanently installed large bushing surrounding a smaller, removable inner bushing. The smaller, inner bushing needs to be removed to transition to larger attach bolts.

Unfortunately, in the aircraft transparency art, bushings are most often removed by knocking out with a hammer and punch. This technique is simple and quick, but the risk of damage to a transparency is very high.

Thus it is seen that there is a need for a new bushing removal tool for removing bushings from aircraft transparencies and like structures, quickly, easily and without damage to the structure surrounding the bushing.

It is, therefore, a principal object of the present invention to provide a new bushing removal tool that can remove bushings from aircraft transparencies and the like using steady, even pressure while providing uniform support to the area surrounding the bushing so that the bushing is removed without damaging the structure into which the bushing is installed.

It is a feature of the present invention that it will permit inspection and repairs to be performed in the field.

It is an advantage of the present invention that it can be used to remove bushings which can only be reached from one side.

It is another advantage of the present invention that it is rugged and easy to use.

These and other objects, features and advantages of the present invention will become apparent as the description of certain representative embodiments proceeds.

SUMMARY OF THE INVENTION

The present invention provides a new bushing removal tool that is particularly suitable for removing bushings from aircraft transparencies without damaging the transparency. The unique discovery of the present invention is that a combination of a tool body with attached base plates, a threaded shaft extending through the tool body, a large nut screwed on a first end of the shaft, and a bushing puller having a pivoting tip attached to a second end of the shaft provide the needed steady removal force and support which are the primary objects of the invention.

Accordingly, the present invention is directed to a bushing removal tool for removing a bushing from a structure, comprising a tool body, support means attached to the tool body for supporting the tool body over the bushing, a bushing puller for engaging the bushing, and pulling means attached to the tool body and to the bushing puller for pulling the bushing out of the structure. The pulling means may comprise a threaded shaft having a first end connected to the bushing puller and a second end extending through a hole in the tool body and attached to a nut, whereby rotation of the nut moves the threaded shaft through the hole in the tool body and pulls the bushing puller. The pulling means may also comprise a hydraulic cylinder and piston or a pneumatic cylinder and piston. The bushing puller may also comprise a shaft sized to fit through the bushing and a tip pivotably attached to the shaft and shaped to engage the bushing whereby, in a first rotated position, the tip and shaft can fit through the bushing and, in a second rotated position, the tip will engage the bushing. The bushing puller may also comprise a shaft sized to closely fit through the bushing and a tip fixed unmovably to the shaft, wherein the tip is shaped to engage the bushing.

DESCRIPTION OF THE DRAWINGS

The present invention will be more clearly understood from a reading of the following detailed description in conjunction with the accompanying drawings wherein.

DETAILED DESCRIPTION

Figure 1:
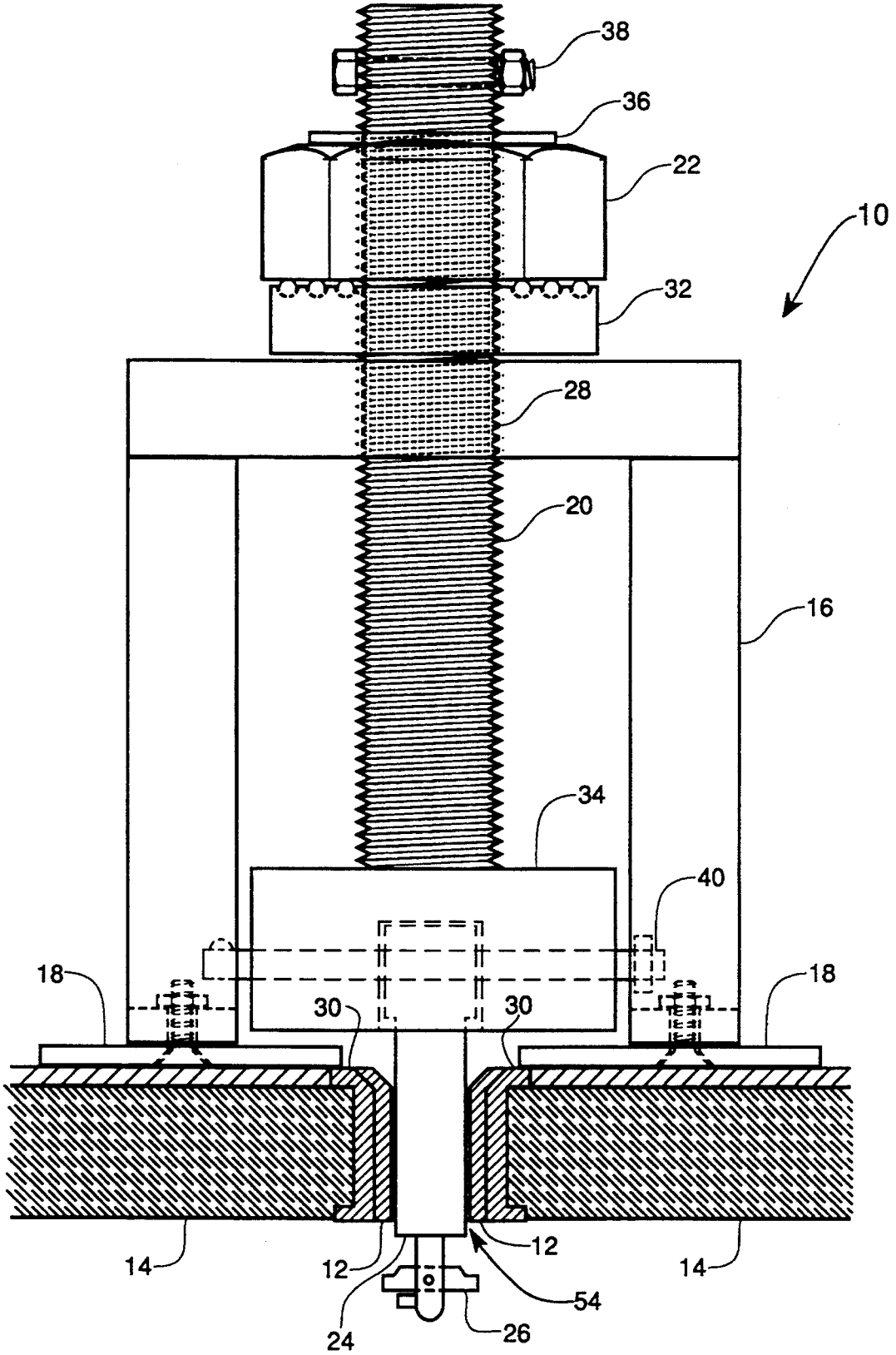
FIG. 1 is a front, partially phantom, view of a bushing removal tool according to the teachings of the present invention.

Referring now to FIG. 1 of the drawings, there is shown a front, partially phantom, view of a bushing removal tool 10. Bushing removal tool 10 is shown in position to remove a bushing 12 from an aircraft transparency 14. Bushing 12 and transparency 14 are shown in cross-section in this figure. The primary components of bushing removal tool 10 are a tool body 16, supporting base plates 18, a threaded shaft 20, a large nut 22, and a bushing puller 24 having a pivoting tip 26.

Tool body 16 is U-shaped and includes a hole 28 for passage of threaded shaft 20. Base plates 18 attach to the bottom of tool body 16 and rest on transparency 14 to spread the load from the bushing removal forces over a wide area. The edges of base plates 18 extend near to the edges 30 where bushing 12 mounts in transparency 14 to control the bending forces that would otherwise damage edges 30 when bushing 12 is removed.

A bearing 32 attaches to the top of tool body 16 to provide a surface over which large nut 22 can be easily rotated. A lower rectangular block 34 attaches to the bottom of threaded shaft 20 so that, as large nut 22 is rotated, lower block 34 rises or falls inside tool body 16. A washer 36 and bolt 38 serve as a limit stop on the distance lower block 34 can fall.

Bushing puller 24 attaches to lower block 34 and is held in place in this embodiment by a bolt 40. Pivoting tip 26 is sized to mate with the bottom of bushing 12.

Figure 2:
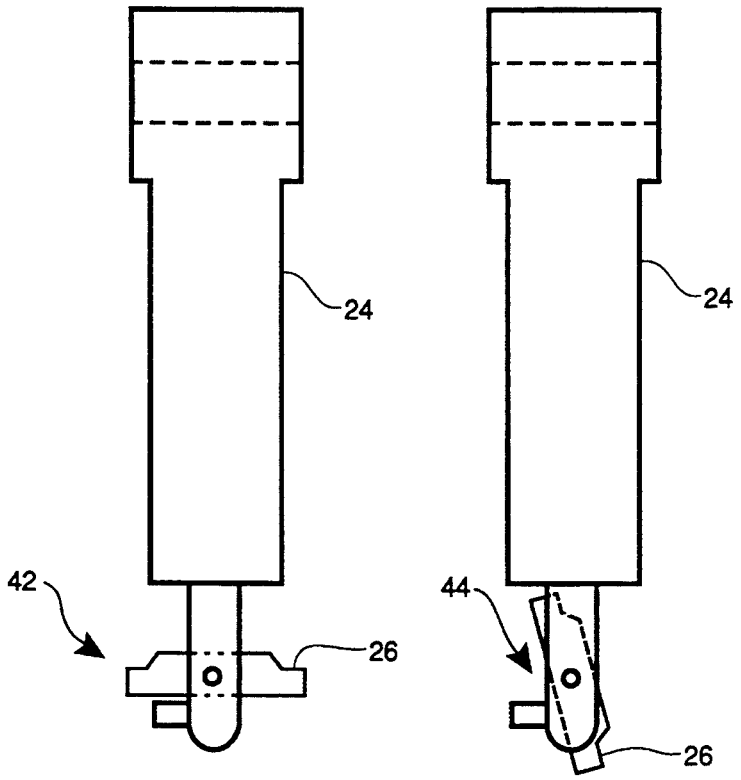
FIG. 2 is a pair of front views of a bushing puller according to the teachings of the present invention showing one embodiment of its pivoting tip.

FIG. 2 shows pivoting tip 26 in two pivoted positions, a first position 42 and a second position 44.

Figure 3:
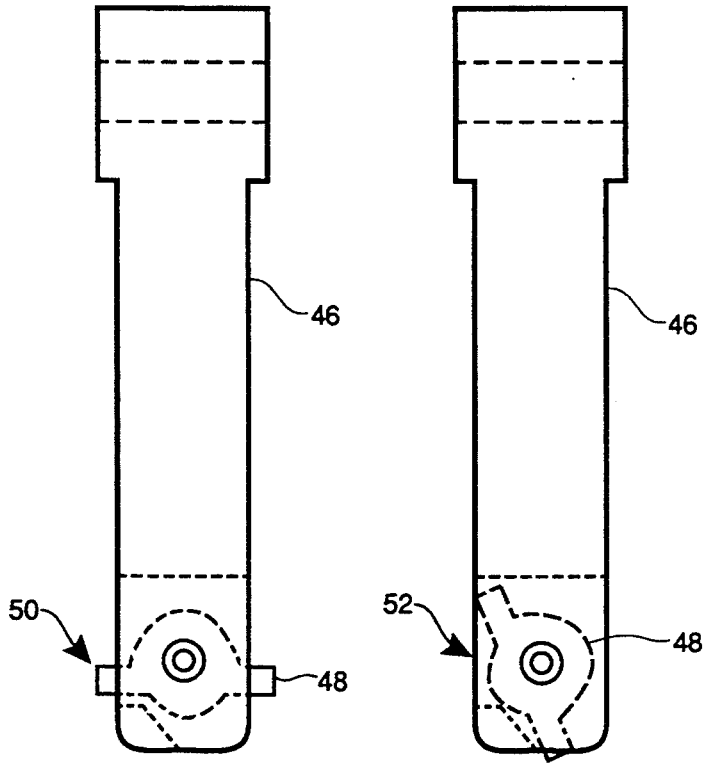
FIG. 3 is a pair of front views of a bushing puller according to the teachings of the present invention showing another embodiment of its pivoting tip.

FIG. 3 shows another embodiment of a bushing puller 46 and a pivoting tip 48 which pivots between positions 50 and 52.

In use, tool body 16 is placed on top of transparency 14 with base plates 18 aligned on both sides of bolt hole 54. Bushing puller 24 is lowered through bolt hole 54 until pivoting tip 26 exits bolt hole 54 on its other side. Pivoting tip 26 remains in position 42, so that it will fit through bolt hole 54, until it exits bolt hole 54. It then falls open to position 44 so that, as large nut 22 is rotated to pull up threaded shaft 20, thereby simultaneously pulling up tip 26, tip 26 engages bushing 12 and begins to pull and remove it from transparency 14.

Figure 4:
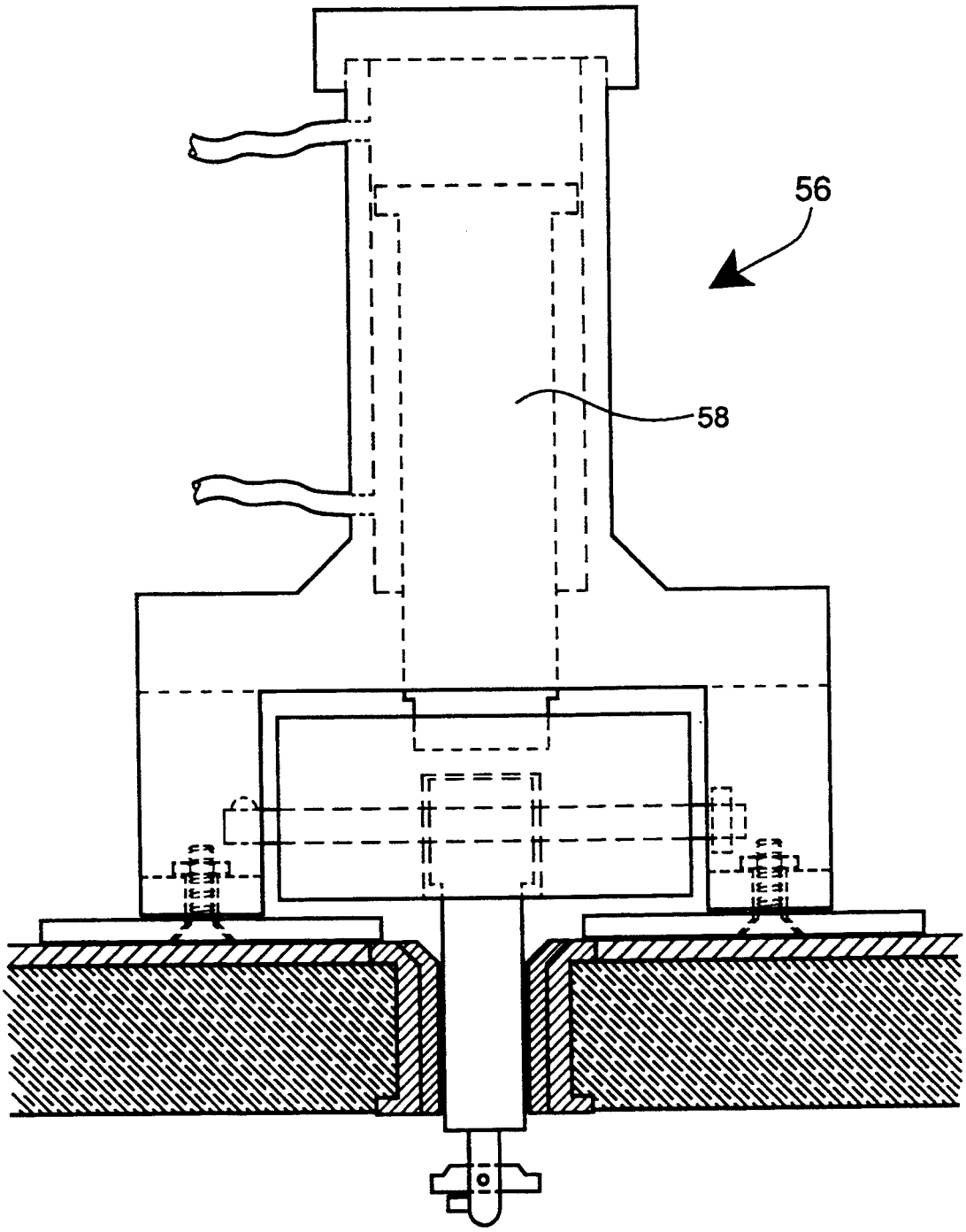
FIG. 4 is a front view of another embodiment of a bushing removal tool according to the teachings of the present invention; and, FIG. 5 is a front view of another alternative embodiment of a bushing removal tool according to the teachings of the present invention.

FIG. 4 is a front view of another embodiment 56 of a bushing removal tool according to the teachings of the present invention. Bushing removal tool 56 replaces the mechanically driven threaded shaft of FIG. 1 with a hydraulic or pneumatic piston 58. Bushing removal tool 56 may be more expensive to build, but would be more suitable for removing large numbers of bushings, such as on a production line.

Figure 5:
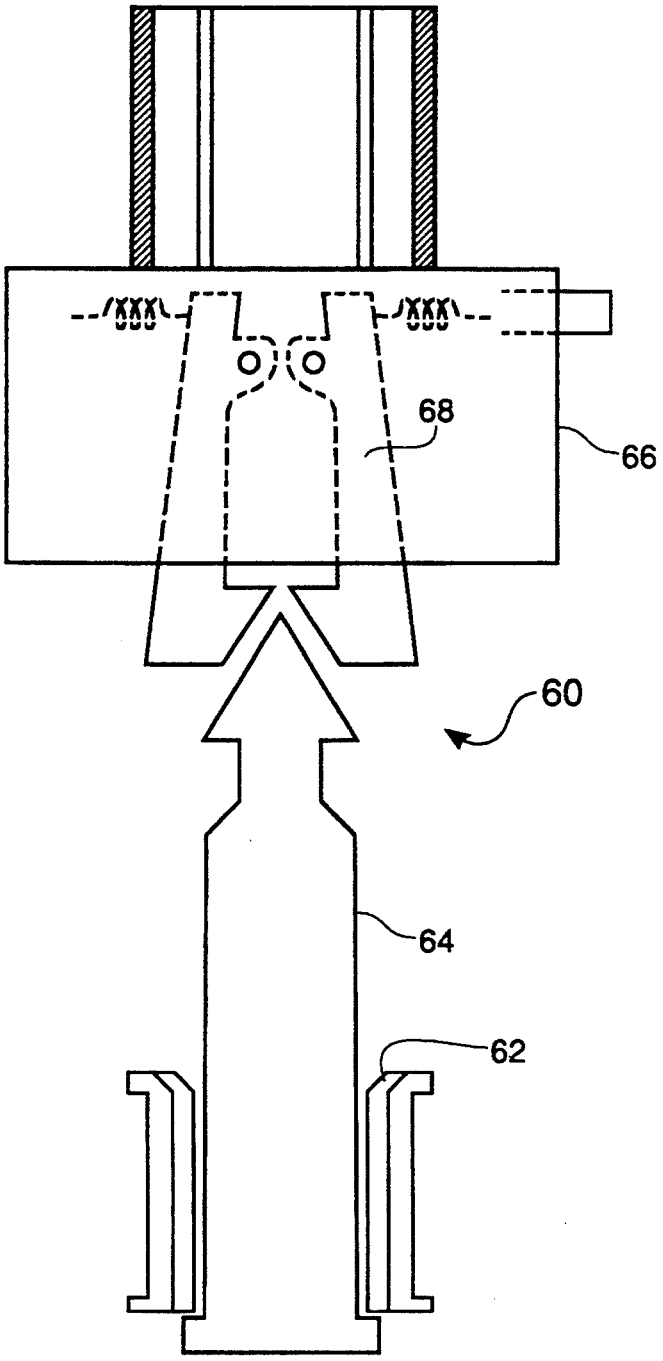

FIG. 5 is a front view of another alternative embodiment 60 of a bushing removal tool according to the teachings of the present invention. Bushing removal tool 60, which may use either the mechanically driven mechanism of FIG. 1 or the hydraulic/pneumatic mechanism of FIG. 4, may be more suitable for use with smaller diameter bushings 62 which may be more easily damaged (thus damaging the transparency into which they are attached) during attempted removal. It may also be more suitable for difficult to remove bushings where the pivot for a pivoting point may prove to be a weak point. Bushing removal tool 60 uses a specially shaped bushing puller 64 designed to be inserted from the back side of bushing 62. Bushing puller 60 latches to a tool body 66 by any prior art latching mechanism, shown here schematically with a spring latch 68.

Those with skill in the art of the invention will readily see that the pivoting tips can be sized and shaped for more precise engagement with different bushings. Similarly, the other elements may be modified, within the teachings of the present invention, for convenience of manufacturing or availability. For example, the threaded shaft need only be threaded along part of its length, and the threading need not extend completely around its circumference. One or more sides of threaded shaft 20 may be flattened to better stabilize the shaft as it moves through the hole in the tool body.

Those with skill in the art of the invention will similarly see that the use of the present invention is not restricted to bushings inside transparencies. It may be used to remove a variety of fittings, including bushings, from a variety of supporting structures, including aircraft transparencies, without damaging the supporting structure.

The disclosed new bushing removal tool successfully demonstrates the use of a combination of base plates, a bushing puller and means for pulling the bushing puller to provide the steady removal force and support necessary to remove bushings from a transparency without damaging the transparency. Although the disclosed apparatus is specialized, its teachings will find application in other areas where fittings are removed from supporting structures and where the resulting damage to the supporting structures is desirably made as little as possible.

It is understood that various modifications to the invention as described may be made, as might occur to one with skill in the field of the invention, within the scope of the claims. Therefore, all embodiments contemplated have not been shown in complete detail. Other embodiments may be developed without departing from the spirit of the invention or from the scope of the claims.

I claim:

1. A bushing removal tool for removing a bushing having a front and back from an opening in a plastic structure, comprising:

(a) a tool body;

(b) support means attached to the tool body for supporting the tool body over the front of the bushing, the support means including a plurality of flat plates arranged so that a flat side of each plate bears on the surface of the plastic structure near and about the opening so that damage from bending forces at the edge of the opening during removal of the bushing is reduced;

(c) a bushing puller for engaging the bushing, the bushing puller comprising:

(i) a shaft having a top and a bottom, the shaft shaped and sized to completely fill the bushing and to be longer than the bushing;

(ii) a fixed flange integral with the bottom of the shaft, the flange sized and shaped to engage the back of the bushing; and, (iii) first counterpart latching means integral with the top of the shaft; and, (d) pulling means attached to the tool body and having second counterpart latching means for latching to the first counterpart latching means.

* * * * *